(12) United States Patent
Heikkilä

(10) Patent No.: US 7,680,222 B2
(45) Date of Patent: Mar. 16, 2010

(54) RECEIVER AND METHOD OF PROCESSING RECEIVED DATA

(75) Inventor: Markku J. Heikkilä, Oulu (FI)

(73) Assignee: Nokia Corporation, Espoo (FI)

( * ) Notice: Subject to any disclaimer, the term of this patent is extended or adjusted under 35 U.S.C. 154(b) by 880 days.

(21) Appl. No.: 11/471,627

(22) Filed: Jun. 21, 2006

(65) Prior Publication Data

US 2007/0002982 A1   Jan. 4, 2007

(30) Foreign Application Priority Data

Jun. 30, 2005   (FI) .................................. 20055368

(51) Int. Cl.
  *H03D 1/00*   (2006.01)
  *H04B 1/10*   (2006.01)
(52) U.S. Cl. ...................... 375/343; 375/350
(58) Field of Classification Search ................ 375/350, 375/346, 343, 316, 340
   See application file for complete search history.

(56) References Cited

U.S. PATENT DOCUMENTS

| | | | | |
|---|---|---|---|---|
| 5,432,821 A | * | 7/1995 | Polydoros et al. | ........... 375/340 |
| 6,434,205 B1 | * | 8/2002 | Taura et al. | ................. 375/355 |
| 2002/0024994 A1 | | 2/2002 | Piirainen et al. | |
| 2005/0053172 A1 | * | 3/2005 | Heikkila | ..................... 375/333 |
| 2005/0281358 A1 | * | 12/2005 | Bottomley et al. | .......... 375/343 |
| 2006/0013250 A1 | * | 1/2006 | Howard et al. | .............. 370/465 |

FOREIGN PATENT DOCUMENTS

WO   WO 2004/079563 A1   9/2004

* cited by examiner

*Primary Examiner*—David C Payne
*Assistant Examiner*—Brian J Stevens
(74) *Attorney, Agent, or Firm*—Squire, Sanders & Dempsey, LLP

(57) ABSTRACT

A receiver includes a channel estimator for estimating a channel impulse response of a radio channel; an equalizer for generating linear minimum mean-square error equalizer coefficients and providing an equalized signal to a correlator; an estimating unit for forming an initial estimate of received data elements on the basis of an equalized signal; and a processing unit. The processing unit is configured to calculate a scaling factor by taking an inverse value, subtracted from a value of one, of a conjugate transpose of a linear minimum mean-square error equalizer coefficient vector multiplied by a channel impulse response vector, and to use the scaling factor for determining reliability of the initial estimate of the received data elements.

32 Claims, 7 Drawing Sheets

RECEIVER AND METHOD OF PROCESSING RECEIVED DATA

FIELD

The invention relates to a method of processing received data in a radio system, to a radio system, to a receiver for a radio system, to a radio terminal, to a base station for a radio system, to a computer program product, and to a computer program distribution medium.

BACKGROUND

Channel decoders related to base band signal processing of WCDMA and CDMA2000 terminal receivers require sufficiently accurate reliability information on channel bits. The reliability information on the channel bits can be supplied by base band detectors, such as Rakes or equalizers. In general, the reliability information is given to a channel decoder in the form of soft outputs, i.e. by scaling channel bit estimates ("raw bits") according to their reliability. Given that a hard channel bit decision $b(k)=\pm 1$, then $c(k)=Qb(k)$ is fed to the channel decoder, where $c(k)$ is a soft channel bit decision at a time instant k, and Q is a scaling factor. A large $Q \geqq 0$ reflects high reliability of the decision, and vice versa. The value of Q should somehow depend on the signal to noise ratio of the detector output.

In addition to channel decoding, reliability information either in the form of soft outputs or packet signal-to-interference ratio (SIR) is required to perform hybrid-ARQ packet combining of retransmitted data packets in a High Speed Downlink Packet Access (HSDPA) system. Misleading reliability information on a failed packet may deteriorate all subsequent retransmissions of the same packet. In HSDPA systems, a terminal receiver also has to transmit a channel quality indicator (CQI) to the base station for scheduling and selecting an optimal modulation scheme and channel coding rate. CQI can be based on SIR estimate.

A Rake detector performs maximal-ratio combining (MRC), which directly produces a usable soft output. A common pilot channel based SIR estimator may be used for helping hybrid-ARQ packet combining to take into account possibly different SIR levels during different packet retransmissions. The SIR estimator is decoupled to the output of a code correlator bank of a Rake receiver.

Typically, a linear chip equalizer output is decoupled to a code correlator and then to a channel decoder as such, without any additional scaling. However, the equalizer output and the output of the code correlator decoupled to the equalizer output may not carry sufficiently good reliability information on the channel bits. This can be observed especially in channels with a small number of multipaths (e.g. PedA in WCDMA and most of the channels in CDMA2000 systems).

A conventional common pilot channel based SIR estimator can be used at the output of a chip-equalizer correlator chain. The SIR estimator can be similar to that of the Rake but now a single-path channel can be assumed. A conventional SIR estimator can be implemented, for example, by using equation (1):

$$SIR = \frac{\left| \frac{1}{K} \sum_{k=0}^{K-1} y(k) \right|^2}{\frac{K}{K-1} \left( \frac{1}{K} \sum_{k=0}^{K-1} |y(k)|^2 - \left| \frac{1}{K} \sum_{k=0}^{K-1} y(k) \right|^2 \right)} \cdot \frac{SF_{hs-dsch}}{SF_{cpich}} \frac{P_{hs-dsch}}{P_{cpich}}, \quad (1)$$

where SIR is a signal to interference ratio, $y(k)$ is a despread common pilot symbol with the effect of pilot symbol $(1+j)$ removed, $SF_{hs-dsch}$ is a spreading factor for HS-DSCH (High Speed-Downlink Shared Channel), $SF_{cpich}$ is a spreading factor for CPICH (Common Pilot Channel), $P_{hs-dsch}$ is the power of HS-DSCH channel, and $P_{cpich}$ is the power of CPICH channel.

The numerator of equation (1) is thus a square of the estimate of the pilot symbol amplitude at the ouput of the chip-equalizer correlator chain, and thus it is an estimate of the received common pilot power. A denominator estimates the interference power by subtracting the pilot power estimate from a total power estimate. The SIR estimate is then scaled according to a data channel's spreading factor and power (relative to the common pilot channel).

However, the conventional SIR estimator suffers from estimation noise and from the fact that in order to simplify the SIR estimator, an SIR estimate may be updated e.g. only once per slot. A need exists for an improved and simpler process for an estimator.

BRIEF DESCRIPTION OF THE INVENTION

An object of the invention is to provide an improved method of processing received data, an improved radio system, a receiver for a radio system, a radio terminal, a base station, a computer program product and a computer program distribution medium. According to an aspect of the invention, there is provided a method of processing received data. The method comprises: forming an initial estimate of received data elements on the basis of an equalized signal; calculating a scaling factor by taking an inverse value, subtracted from a value of one, of a conjugate transpose of a linear minimum mean-square error equalizer coefficient vector multiplied by a channel impulse response vector; and using the scaling factor for determining reliability of the initial estimate of the received data elements.

According to another aspect of the invention, there is provided a receiver for a radio system, comprising: at least one antenna for receiving data from a radio channel; a channel estimator coupled to the antenna for estimating a channel impulse response of the radio channel; an equalizer coupled to the antenna and to the channel estimator for generating linear minimum mean-square error equalizer coefficients and providing an equalized signal; an estimating unit for forming an initial estimate of received data elements on the basis of the equalized signal; and a processing unit. The processing unit is configured to calculate a scaling factor by taking an inverse value, subtracted from a value of one, of a conjugate transpose of a linear minimum mean-square error equalizer coefficient vector multiplied by a channel impulse response vector, and to use the scaling factor for determining reliability of the initial estimate of the received data elements.

According to another aspect of the invention, there is provided a receiver for a radio system, comprising: receiving means for receiving data from a radio channel; estimating means for estimating a channel impulse response of the radio channel; equalizing means for generating linear minimum mean-square error equalizer coefficients and providing an equalized signal; estimating means for forming an initial estimate of received data elements on the basis of the equalized signal; and processing means for calculating a scaling factor by taking an inverse value, subtracted from a value of one, of a conjugate transpose of a linear minimum mean-square error equalizer coefficient vector multiplied by a channel impulse response vector, and for using the scaling factor for determining reliability of the initial estimate of the received data elements.

According to another aspect of the invention, there is provided a radio system, comprising at least one receiver including: at least one antenna for receiving data from a radio channel; a channel estimator coupled to the antenna for estimating a channel impulse response of the radio channel; an equalizer coupled to the antenna and to the channel estimator for generating linear minimum mean-square error equalizer coefficients and providing an equalized signal; an estimating unit for forming an initial estimate of received data elements on the basis of the equalized signal; and a processing unit configured to calculate a scaling factor by taking an inverse value, subtracted from a value of one, of a conjugate transpose of a linear minimum mean-square error equalizer coefficient vector multiplied by a channel impulse response vector, and to use the scaling factor for determining reliability of the initial estimate of the received data elements.

According to another aspect of the invention, there is provided a radio system comprising at least one receiver including: receiving means for receiving data from a radio channel; estimating means for estimating a channel impulse response of the radio channel; equalizing means for generating linear minimum mean-square error equalizer coefficients and providing an equalized signal; estimating means for forming an initial estimate of received data elements on the basis of the equalized signal; and processing means for calculating a scaling factor by taking an inverse value, subtracted from a value of one, of a conjugate transpose of a linear minimum mean-square error equalizer coefficient vector multiplied by a channel impulse response vector, and for using the scaling factor for determining reliability of the initial estimate of the received data elements.

According to another aspect of the invention, there is provided a radio terminal, comprising at least one receiver inducing: at least one antenna for receiving data from a radio channel; a channel estimator coupled to the antenna for estimating a channel impulse response of the radio channel; an equalizer coupled to the antenna and to the channel estimator for generating linear minimum mean-square error equalizer coefficients and providing an equalized signal; an estimating unit for forming an initial estimate of received data elements on the basis of an equalized signal; and a processing unit configured to calculate a scaling factor by taking an inverse value, subtracted from a value of one, of a conjugate transpose of a linear minimum mean-square error equalizer coefficient vector multiplied by a channel impulse response vector, and to use the scaling factor for determining reliability of the initial estimate of the received data elements.

According to another aspect of the invention, there is provided a base station for a radio system, comprising at least one receiver including: at least one antenna for receiving data from a radio channel; a channel estimator coupled to the antenna for estimating a channel impulse response of the radio channel; an equalizer coupled to the antenna and to the channel estimator for generating linear minimum mean-square error equalizer coefficients and providing an equalized signal; an estimating unit for forming an initial estimate of received data elements on the basis of an equalized signal; and a processing unit configured to calculate a scaling factor by taking an inverse value, subtracted from a value of one, of a conjugate transpose of a linear minimum mean-square error equalizer coefficient vector multiplied by a channel impulse response vector, and to use the scaling factor for determining reliability of the initial estimate of the received data elements.

According to another aspect of the invention, there is provided a computer program product encoding a computer process of instructions for executing a computer process for processing received data. The process includes: forming an initial estimate of received data elements on the basis of an equalized signal; calculating a scaling factor by taking an inverse value, subtracted from a value of one, of a conjugate transpose of a linear minimum mean-square error equalizer coefficient vector multiplied by a channel impulse response vector; and using the scaling factor for determining reliability of the initial estimate of the received data elements.

According to another aspect of the invention, there is provided a computer program distribution medium readable by a computer and encoding a computer program of instructions for executing a computer process for processing received data. The process includes: forming an initial estimate of received data elements on the basis of an equalized signal; calculating a scaling factor by taking an inverse value, subtracted from a value of one, of a conjugate transpose of a linear minimum mean-square error equalizer coefficient vector multiplied by a channel impulse response vector; and using the scaling factor for determining reliability of the initial estimate of the received data elements.

The invention provides several advantages. The performance of the receiver is improved. Power consumption is reduced. Estimation errors are reduced significantly. The reliability of the radio system is improved. More accurate estimates with less computation are achieved.

LIST OF DRAWINGS

In the following, the invention will be described in greater detail with reference to embodiments and the accompanying drawings, in which FIG. 1 shows a simplified block diagram illustrating a structure of a radio system;

DESCRIPTION OF EMBODIMENTS

Figure 1:
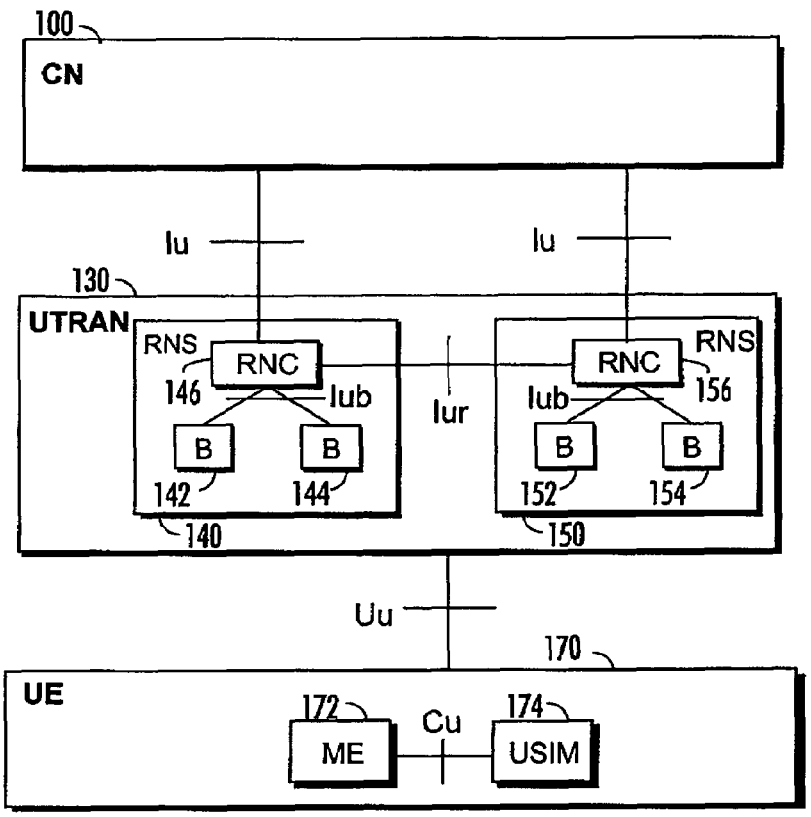

FIG. 1 illustrates an example of a radio system to which the embodiments of the invention can be applied. A radio system in FIG. 1, known at least as UTRAN [UMTS (Universal Mobile Telecommunications System) Terrestrial Radio Access Network] 130, is taken as an example. The UTRAN belongs to the third generation and is implemented with WCDMA (Wideband Code Division Multiple Access) technology. The solution is not limited to a WCDMA radio interface but applications exist which are implemented with cdma2000, MC-CDMA (Multi-Carrier Code Division Multiple Access) or OFDMA (Orthogonal Frequency Division Multiple Access) technologies without restricting the invention to the above-mentioned technologies.

FIG. 1 is a simplified block diagram showing the most important parts of a radio system and the interfaces between them at a network-element level. The structure and functions of the network elements are not described in detail, because they are generally known.

The main parts of a radio system are a core network (CN) 100, a radio access network 130 and a terminal receiver (UE) 170. The term UTRAN is short for UMTS Terrestrial Radio Access Network, i.e. the radio access net-work 130 belongs to the third generation and is implemented by wideband code division multiple access (WCDMA) technology. The main elements of the UTRAN are radio network controller (RNC) 146, 156, Node Bs 142, 144, 152, 154 and terminal receiver 170. The UTRAN is attached to the existing GSM core network 100 via an interface called Iu. This interface is supported by the RNC 146, 156, which manages a set of base stations called Node Bs 142, 144, 152, 154 through interfaces called Iub. The UTRAN is largely autonomous from the core network 100 since the RNCs 146, 156 are interconnected by the Iur interface.

On a general level, the radio system can also be defined to com-prise a user, such as a subscriber terminal or a mobile phone, and a network part, which comprises the fixed infrastructure of the radio system, i.e. the core network, radio access network and base station system.

From the point of view of Node B 142, 144, 152, 154, i.e. a base station, there is one controlling RNC 146, 156 where its Iub interface terminates. The controlling RNC 146, 156 also takes care of admission control for new mobiles or services attempting to use the Node B 142, 144, 152, 154. The controlling RNC 146, 156 and its Node Bs 142, 144, 152, 154 form an RNS (Radio Network Subsystem) 140, 150.

The terminal receiver 170 may comprise mobile equipment (ME) 172 and a UMTS subscriber identity module (USIM) 174. The USIM 174 contains information related to the user and information related to information security in particular, for instance, an encryption algorithm.

In UMTS networks, the terminal receiver 170 can be simultaneously connected to a plurality of Node Bs in the occurrence of soft handover.

From point of view of the terminal receiver 170, there is a serving RNC 146, 156 that terminates the mobile link layer communications. From the point of view of the CN 100, the serving RNC 146, 156 terminates the Iu for this terminal receiver 170. The serving RNC 146, 156 also takes care of admission control for new mobiles or services attempting to use the CN 100 over its Iu interface.

In the UMTS, the most important interfaces between network elements are the Iu interface between the CN 100 and the radio access network 130, which is divided into the interface IuCS on the circuit-switched side and the interface IuPS on the packet-switched side, and the Uu interface between the radio access network and the terminal receiver.

A HSPA (High Speed Packet Access) concept is based on 3G WCDMA technologies. The HSPA provides higher performance levels in 3G networks. A HSDPA (High Speed Downlink Packet Access) is a feature of WCDMA providing high data rate transmission in a CDMA downlink to support multimedia services. The HSDPA concept is used to increase packet data throughput by means of fast physical layer retransmission and transmission combining as well as fast link adaptation controlled by the Node-B. In HSDPA, the packet scheduling decisions are performed in the Node-B. The HS-DSCH (High Speed-Downlink Shared Channel) is used in HSDPA for signalling between the Node-B and the terminal receiver 170. The CPICH (common pilot channel) is a common control channel that provides a reference signal for coherent detection, cell acquisition, and handover in code division multiple access (CDMA).

Figure 2:
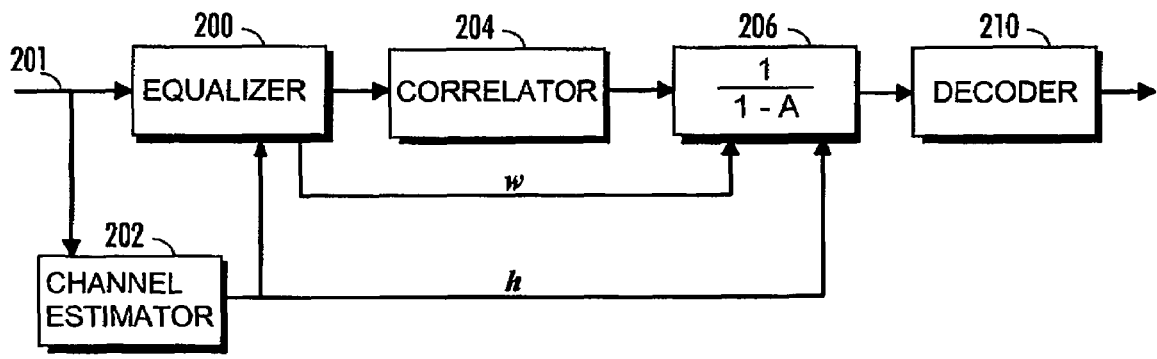
FIG. 2 illustrates a block diagram of a receiver according to an embodiment of the invention.

FIG. 2 illustrates a block diagram of a receiver according to an embodiment. Signals are received by one or more antennas of the receiver from a radio channel 201. Signals are next converted to samples of received data and fed to a chip equalizer 200 and to a channel estimator 202. The channel estimator 202 estimates a channel impulse response of the radio channel and provides channel inpulse response vectors h to the chip equalizer 200 and to a scaling unit 206. The chip equalizer 200 is configured to provide linear minimum mean-square error equalizer coefficients and an equalized output signal to a code correlator 204. The code correlator 204 provides initial estimates of the received data elements based on the output of the chip equalizer 200. The received data elements are, for example, data symbols or bits. The code correlator 204 is configured to form the initial estimates of the received data elements on the basis of an equalized signal and the spreading code. In systems where no spreading is used, no correlator 204 is necessary, and the initial symbol estimate can be provided by the output of the equalizer 200. Thus, the equalizer 200 may comprise an estimating unit for estimating the initial estimates of the received data elements.

According to an embodiment, the output of the code correlator 204 is coupled to the scaling unit 206. The scaling unit 206 is configured to calculate a scaling factor by taking an inverse value, subtracted from a value of one, of a conjugate transpose of a linear minimum mean-square error equalizer coefficient vector multiplied by a channel impulse response vector, and to use the scaling factor for determining reliability of an initial estimate of received data elements, for example, by forming a final estimate of the received data elements by multiplying the initial estimate of data elements received from the correlator by the calculated scaling factor. Alternatively, the scaling factor can be used for multiplying channel bit estimates generated from the initial symbol estimate. The output of the scaling unit 206 is coupled to a decoder 210, which outputs data decisions.

In an embodiment, a simple estimator producing a good soft output for a chip equalizer receiver for more reliable channel decoding and H-ARQ packet combining is proposed. Simultaneously, the estimator may be used for SIR estimation, which in turn can be applied e.g. to CQI generation. If the equalizer is further applied to reception of speech channels, the same estimator can be used for closed-loop power control. The proposed receiver requires almost no extra computation since most of the computation is performed in an HSDPA detector in any case. In an embodiment, basically only one real subtraction and one real division are required for generating the soft output. SIR estimates may be obtained with similar simplicity. The resulting soft output quality is better than with unscaled equalizer outputs, and the corresponding SIR estimates have less estimation noise compared to conventional SIR estimators (Equation 1), which employ despread common pilot symbols.

In an embodiment, the output of the code correlator 204, i.e. the initial estimate of the received data elements, may be defined as:

$$\hat{b}(k) = \sqrt{P_{hs-dsch}}(w^H h)b(k) + n(k) = Ab(k) + n(k), \qquad (2)$$

where $\hat{b}(k)$ is an initial estimate of the received data elements, k is a time index, $P_{hs-dsch}$ is the power of an HS-DSCH channel, w is a vector consisting of linear minimum mean-square error chip-equalizer filter coefficients, h is a channel impulse response vector, $(\ )^H$ denotes a conjugate transpose, b(k) is the ideal, transmitted symbol with power 1, and A is its amplitude at the code correlator output, and n(k) is noise-plus-interference. The term A is real valued and already computed by an HSDPA detector, for example, because the symbol amplitude is needed for 16-QAM (Quadrature Amplitude Modulation) detection. The channel impulse response vector h is readily available because it is required by the chip equalizer 200 filter tap solver.

Only the equalizer coefficients are needed for providing the initial symbol estimate (shown in equation 2). Equation 2 shows what the initial estimate will be when equalizer w and channel vector h are used. Of course, to generate equalizer coefficients, channel vector h as shown in FIG. 1 may be needed.

In an embodiment, the final estimate of the received data elements may be defined as:

$$\hat{c}(k) = \frac{1}{1 - w^H h}\hat{b}(k) = \frac{1}{1-A}\hat{b}(k) \qquad (3)$$

where $\hat{c}(k)$ is the soft output, i.e. the final estimate of the received data elements, $A = w^H h$, and $$\frac{1}{1 - w^H h} = \frac{1}{1-A}$$

is the scaling factor.

Thus, a soft symbol output is produced where the symbol amplitude carries information on SIR of the symbol estimate. In an embodiment, averaging is unnecessary for obtaining SIR related information for the soft symbol estimate, and thus instantaneous SIR information can be embedded into the soft output, provided that an up-to-date equalizer and channel vectors are available.

In an embodiment, the scaling factor may be incorporated into the chip equalizer 200 coefficients so that weighting is automatically included in the equalizer ouput. The weighting also automatically results in reliable H-ARQ packet combining weights. Some well-known methods also exist for generating soft bit information giving a soft symbol estimate, for example methods based on Euclidean distance to decision borders. These methods may be used together with the proposed embodiments. The scaling factor may also be used for multiplying soft bit estimates instead of soft symbol estimates.

In theory, the denominator 1-A in Equation (3) obtains no negative value. Even in the case of some hypothetical mismatch, it is straight-forward to force values less than or equal to 0 to some small positive constants. It can be indicated that $A \geq 1$ may occur only if A is computed using a new channel estimate, and an out-of-date equalizer vector using a different channel estimate.

Equation (3) implicitly assumes that the average base station transmit power is 1.0. This simply moves the effect of the actual received power to scaling of channel estimates. An embodiment of the invention is based on interconnection between a chip equalizer 200 output mean-squared error (MSE) and SIR at the code correlator 204 output. Equation (3) can be based on theoretical SIR computation at LMMSE equalizer ouput. Althought based on a chip-level signal model, signal components orthogonal at symbol level and thus causing no interference are not included in the equalizer output MSE and do not affect the scaling. Further, a bias caused by the equalizer is not considered as interference in Equation (3).

It may be assumed that equalizer w is computed using same channel vector h as is used for computing the term A. An approach of using a covariance matrix constructed using the channel estimate vector h for computing the equalizer results directly in the desired scaling (1−A>0). If there is a known scaling mismatch exists between vector h and equalizer w, the unity ("1") in the denominator of the scaling factor in Equation (3) may be replaced by another value taking the mismatch into account. Alternatively, either h or w may both be scaled such that the mismatch is compensated for.

In an embodiment, if an SIR estimate is explicitly required, it can be simply defined as:

$$SIR = \frac{A}{1-A} \cdot SF \cdot P_{hs-dsch}, \qquad (4)$$

where $A = w^H h$ and SF is a spreading factor. The shown scaling using the spreading factor and power level may be included as in the case of the conventional SIR estimation in Equation (1). However, the scaling is only needed if an unbiased estimate is required (as for CQI). Thus, DSCH power may not be needed for channel decoding or H-ARQ packet combining. Unlike in Equation (1), averaging is not required for obtaining the estimate, i.e. each symbol gets its own accurate SIR estimate as long as an updated equalizer filter vector is available. The equalizer output estimation error measured by MSE of the chip estimates most probably is not white sequence. However, since a code correlator descrambles the signal, thus scrambling the error signal, making it appear as white, factor SF in Equation (4) is justified.

Figure 3:
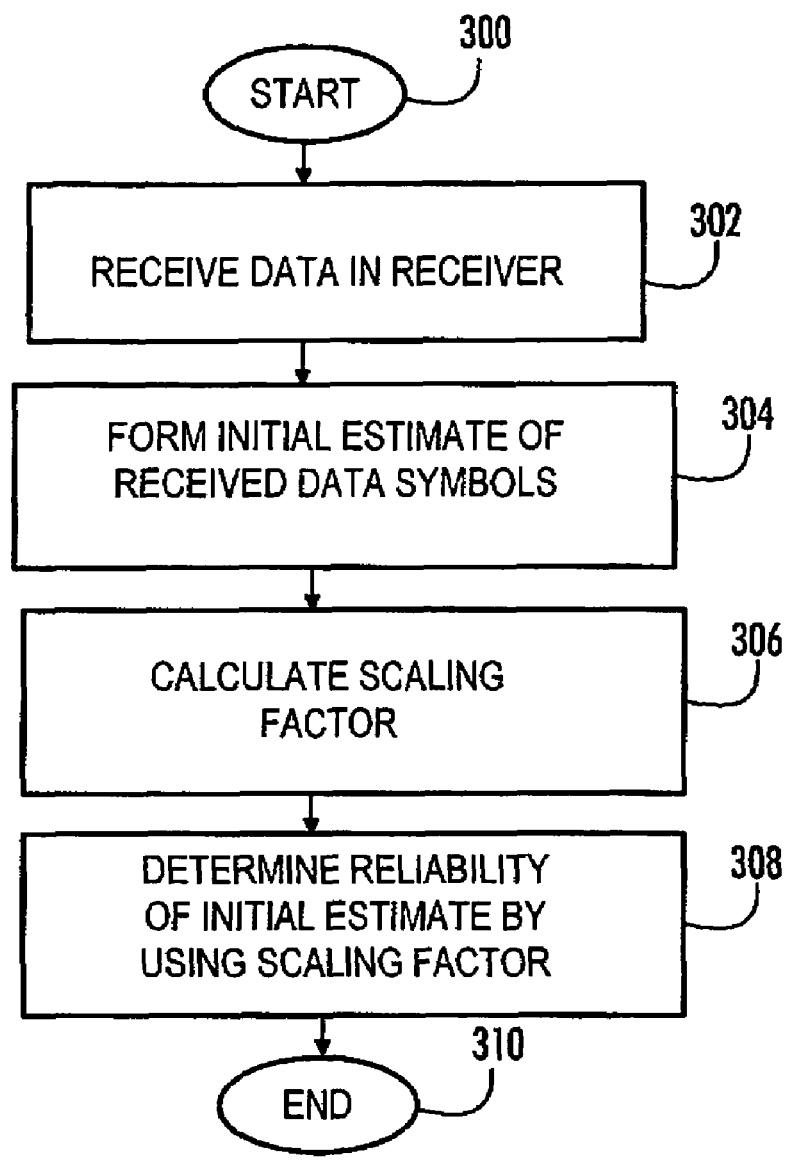
FIG. 3 illustrates an example of a method of processing received data in a radio system.

FIG. 3 illustrates an example of a method of processing received data in a radio system. The method starts in 300. In 302, data is received from a radio channel. In 304, an initial estimate of received data elements is formed. In 306, a scaling factor is calculated by taking an inverse value, subtracted from a value of one, of a conjugate transpose of a linear minimum mean-square error equalizer coefficient vector multiplied by a channel impulse response vector. In 308, reliability of the initial estimate of the received data elements is determined. The reliability can be determined, for example, by multiplying the initial estimate by the calculated scaling factor for obtaining a final estimate of the received data elements. In another embodiment, the reliability of the received data elements can be determined by obtaining a signal-to-interference ratio on the basis of the scaling factor, a linear minimum mean-square error equalizer coefficient vector, a channel impulse response vector, and a spreading factor. The method ends in 310.

Next, examples illustrating the functionality of embodiments of the invention are shown. The functionality of the proposed soft output generation method and the SIR estimator is illustrated in an HSDPA radio system. The radio system in the following examples comprises a continuously fading multipath channel, an actual channel coefficient and a delay estimation, over-sampling, chip pulse shaping and a Cholesky based LMMSE chip-equalizer tap solver applying a signal covariance matrix constructed using estimated channel coefficients.

Figure 4:
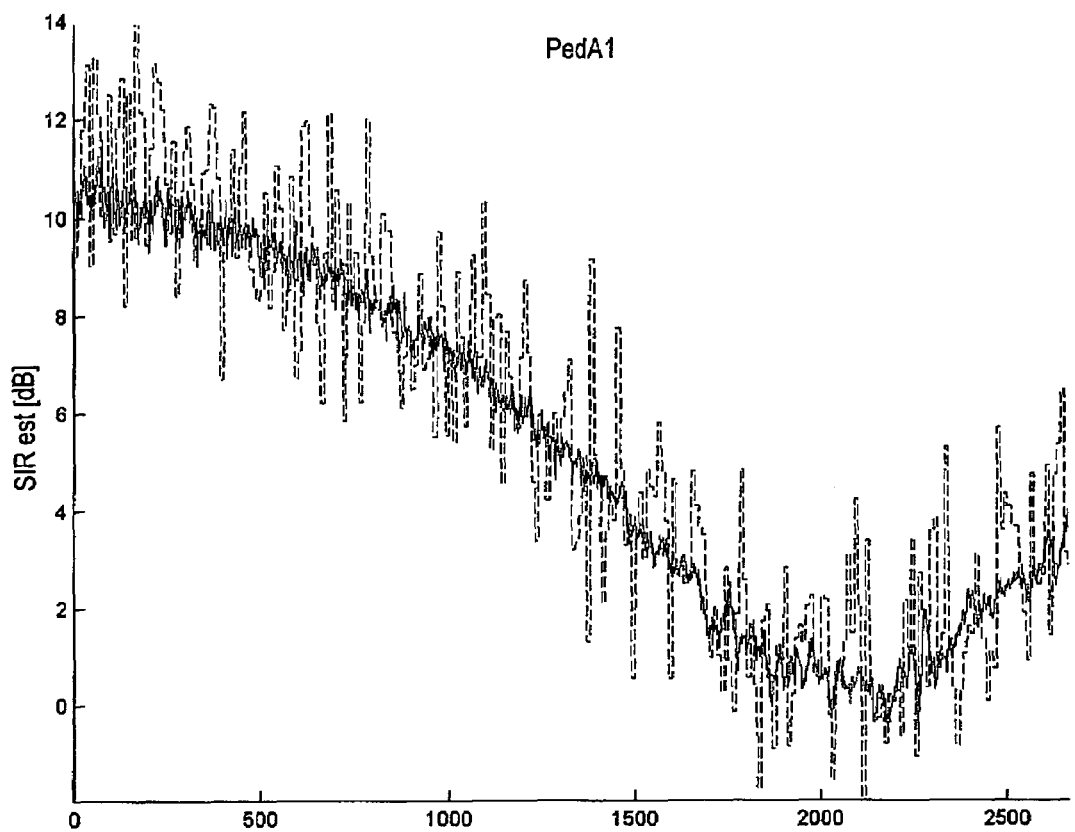
FIG. 4 shows SIR estimates generated by a receiver according to an embodiment of the invention and by a conventional receiver in a slow Pedestrian A channel (1 km/h, 2 paths, G=5 dB)

FIG. 4 illustrates SIR estimates as a function of time in a very slowly fading channel (PedA, 1 km/h, 2 paths, G=5 dB). The dashed line represents a conventional method and the continuous line represents the proposed method according to an embodiment. A conventional estimator applies Equation (1) and averaging over one slot. In an embodiment, the proposed method applies Equation (4) and updates at a pilot symbol rate while the equalizer is updated only twice per slot. It can be seen that the conventional estimator causes significant estimation errors. In slow channels the observed SIR variation cannot be due to channel changes but must be due to estimation errors. The method according to an embodiment of the invention gives more accurate estimates with less computation. This should affect the quality of CQI, adaptive modulation and coding, and channel decoding.

Figure 5:
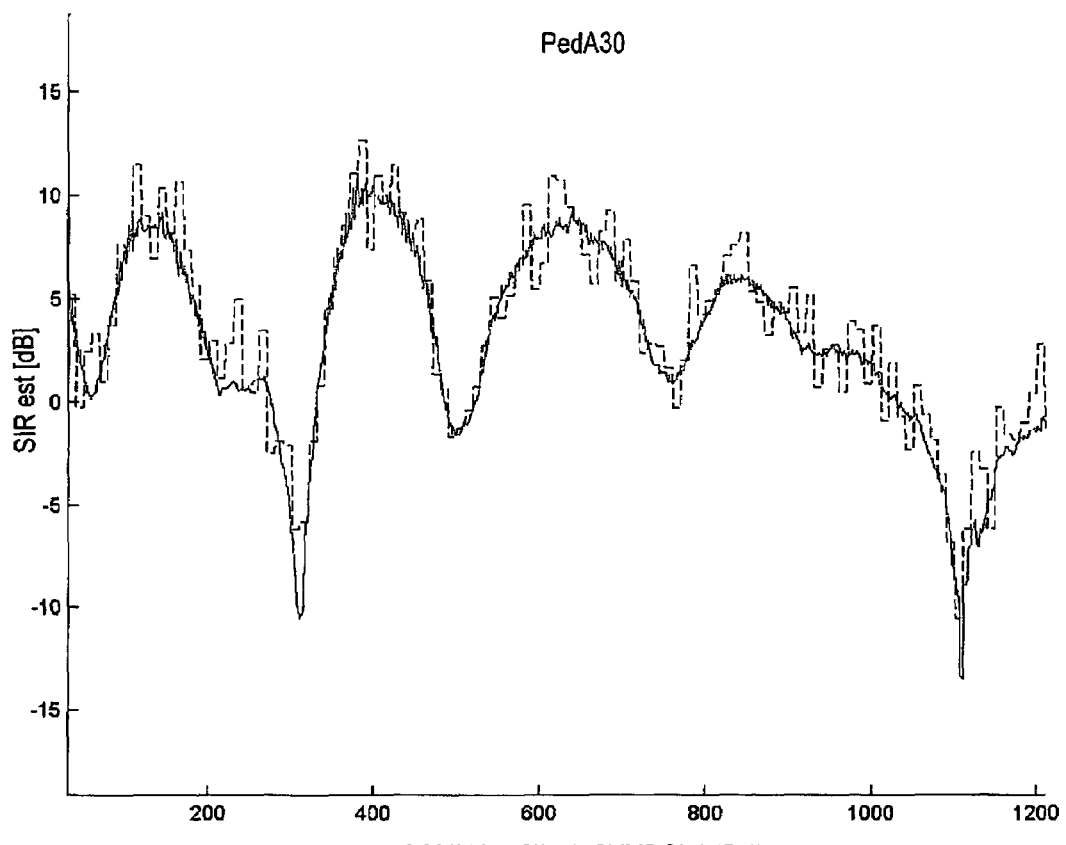
FIG. 5 shows SIR estimates generated by a receiver according to an embodiment of the invention and by a conventional receiver in a fast Pedestrian A channel (30 km/h, 2 paths, G=5 dB)

FIG. 5 illustrates an example in a fast Pedestrian A channel (30 km/h, 2 paths, G=5 dB). The dashed line represents a conventional method and the continuous line represents the proposed method according to an embodiment. The SIR estimate of a conventional SIR estimator is fixed over one slot interval. As one packet interval (TTI) consists of three slots, it can be seen that the conventional estimator may falsely indicate significant SIR changes during one code word, thus misleading the channel decoder, and possibly affecting H-ARQ combining performance. The weighting, as given in Equation (3), will include the SIR information shown in FIG. 5 into the soft bit estimates with no need to compute the SIR estimate (4) explicitly.

Figure 6:
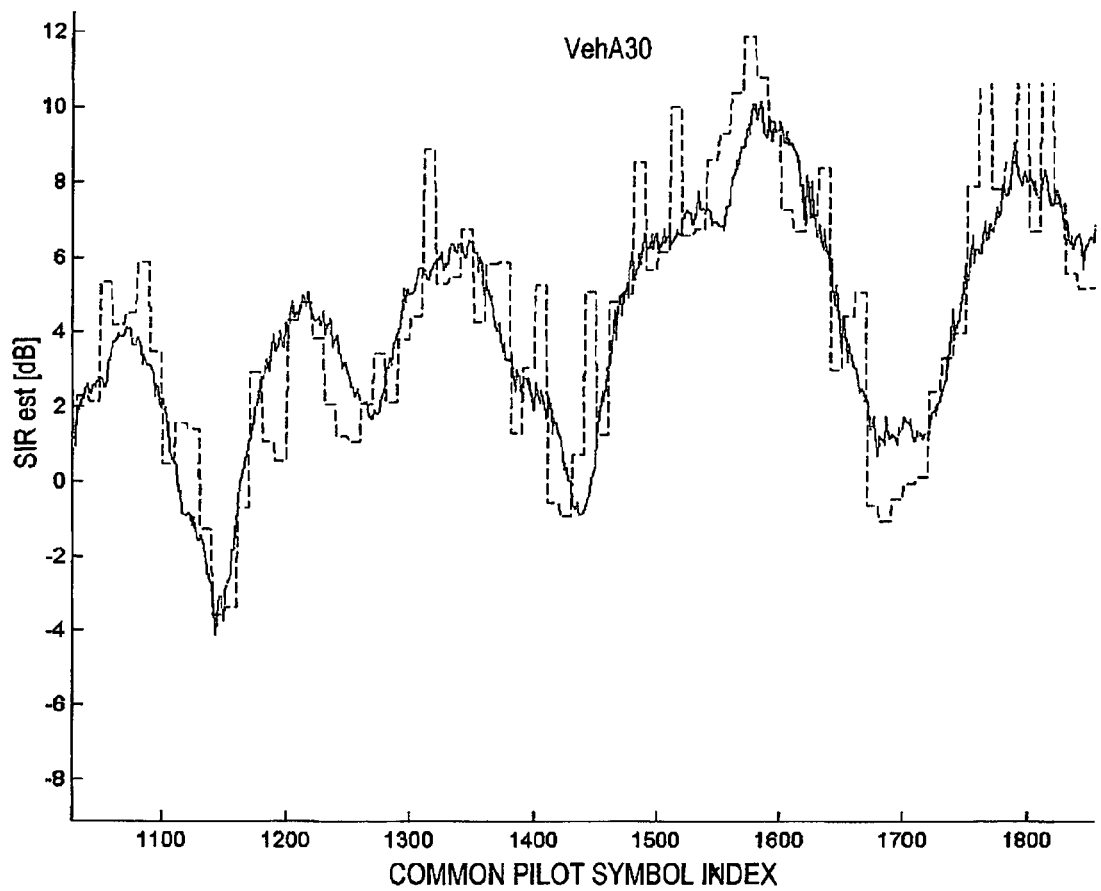
FIG. 6 shows SIR estimates generated by a receiver according to an embodiment of the invention and by a conventional receiver in a Vehicular A channel (30 km/h, 5 paths, G=5 dB)

FIG. 6 further illustrates that the method of an embodiment of the invention performs equally well in channels with significant multipath propagation (Vehicular A, 30 km/h, 5 paths, G=5 dB) and offers more robust estimates than the conventional SIR estimator. Again, the dashed line represents a conventional method and the continuous line represents the proposed method according to an embodiment.

Figure 7:
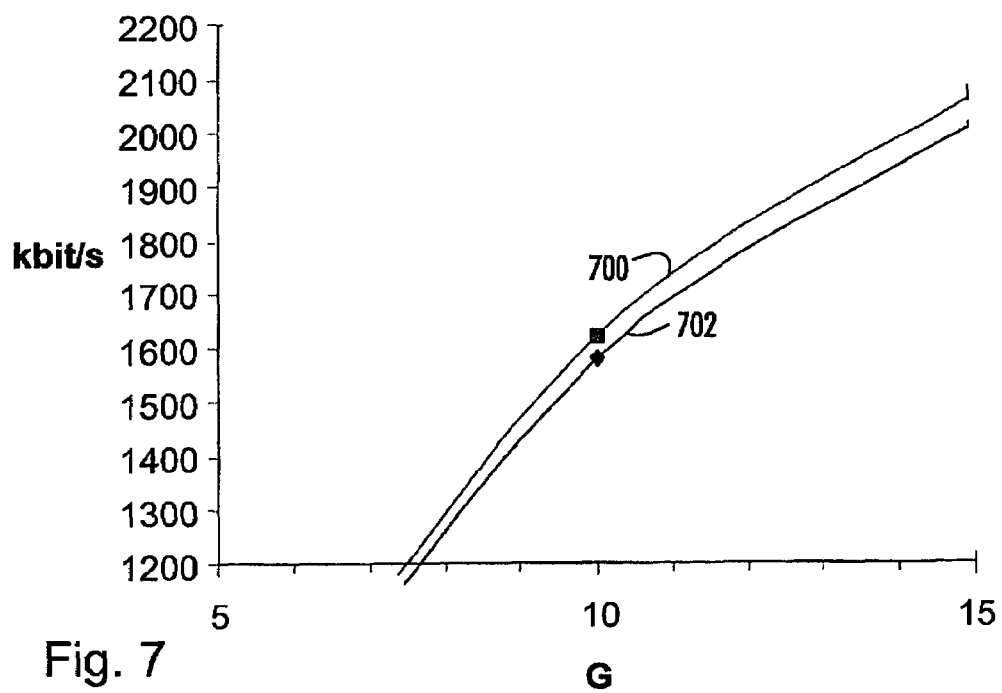
FIG. 7 shows a comparison between performances of a conventional receiver, and a receiver according to an embodiment of the invention.

FIG. 7 shows a comparison between performances of a conventional receiver and a receiver according to an embodiment of the invention (PedA, 50 km/h, HSDPA with no retransmissions, 5 codes, 16-QAM, max 2400 kbit/s). Line 700 represents a result of an embodiment of the invention and line 702 represents a result of an unscaled equation output. It can be seen that the proposed method offers throughput gain even without hybrid-ARQ, i.e. the method improves the soft bits, thus reducing frame errors.

Figure 8:
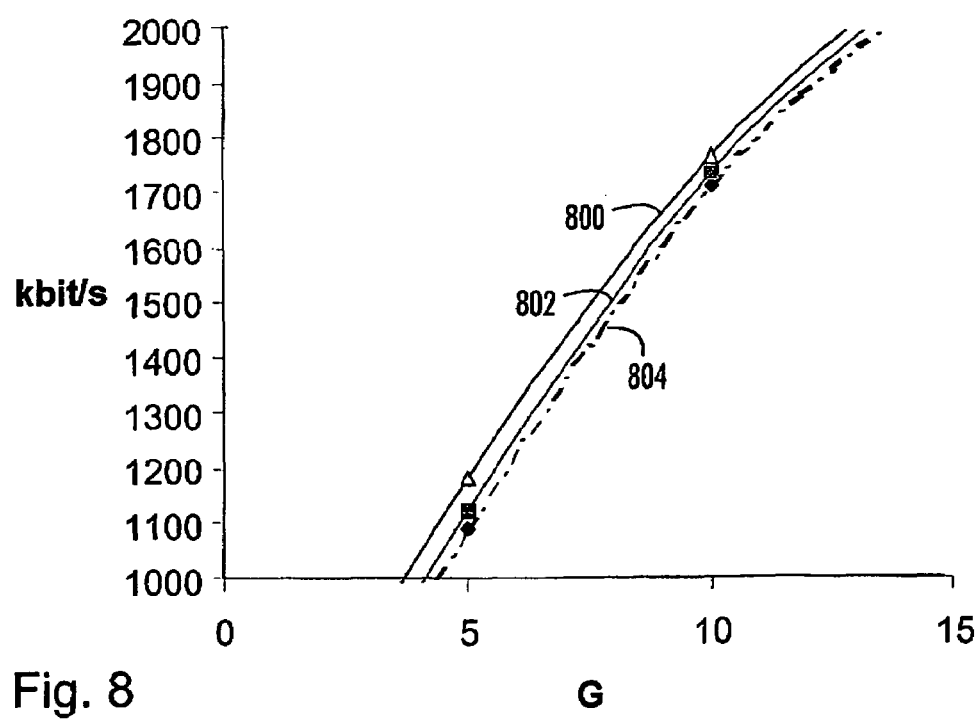
FIG. 8 shows a comparison between performances of a conventional receiver, a receiver with conventional SIR-estimation, and a receiver according to an embodiment of the invention (PedA channel)

FIG. 8 illustrates a comparison between an unmodified equalizer, an unmodified equalizer with conventional SIR estimation aided soft output generation/packet combining, and an equalizer with the proposed soft output generation method (PedA, 50 km/h, HSDPA with max 3 retransmissions, 5 codes, 16-QAM, max 2400 kbit/s). Line 800 represents a result of an embodiment of the invention, line 802 represents a result of an unscaled equation and conventional SIR based packet combining. Line 804 represents a result of an unscaled equation output. It can be seen that the more complex conventional method improves the unscaled equalizer performance only slightly while the proposed method provides significant improvement (4 to 9% in throughput).

Figure 9:
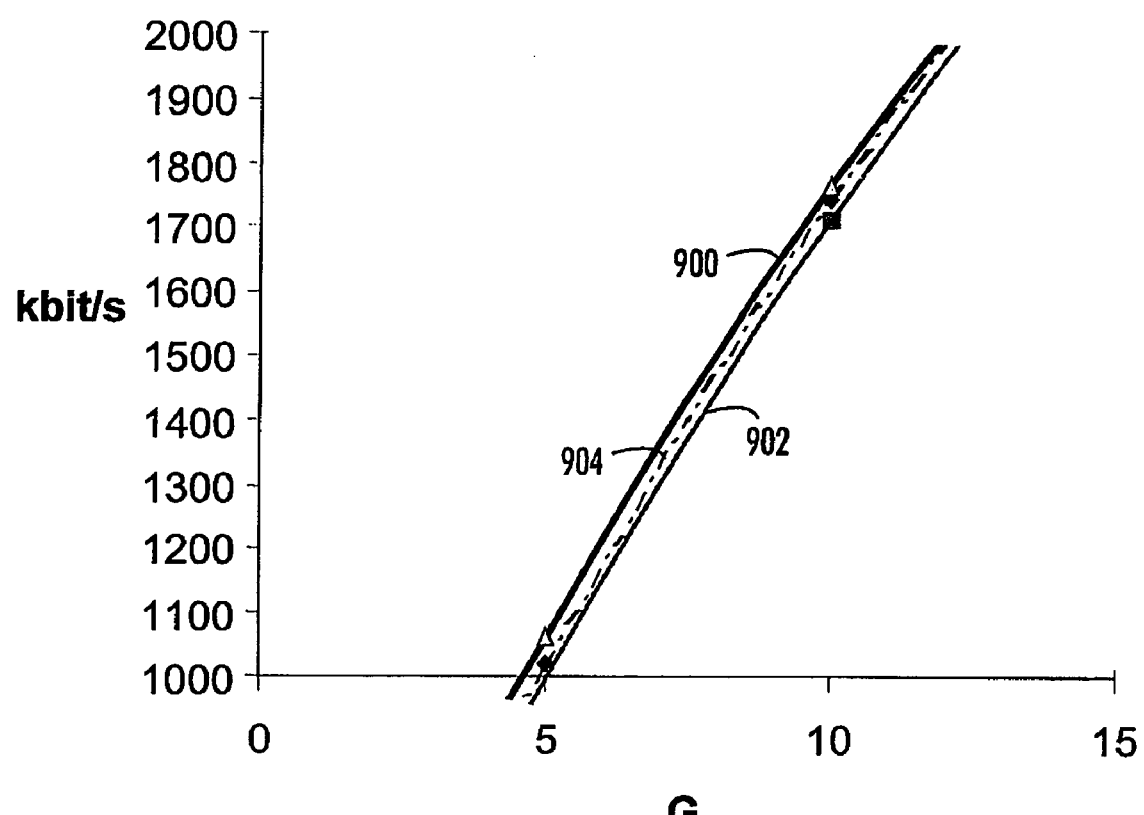
FIG. 9 shows a comparison between performances of a conventional receiver, a receiver with conventional SIR-estimation, and a receiver according to an embodiment of the invention (VehA channel).

FIG. 9 shows a comparison between performances of a conventional receiver, a receiver with conventional SIR estimation, and a receiver according to an embodiment of the invention (VehA channel 50 km/h, HSDPA with max 3 retransmissions, 5 codes, 16-QAM, max 2400 kbit/s). Line 900 represents a result of an embodiment of the invention, line 902 represents a result of an unscaled equation and conventional SIR based packet combining. Line 904 represents a result of an unscaled equation output. The difference between an unscaled equalizer and the proposed method is now smaller but some improvement can still be observed. Thus, the conventional SIR estimation results in performance loss.

In an aspect, the invention provides a computer program product encoding a computer program of instructions for executing a computer proc-ess for processing received data.

In another aspect, the invention provides a computer program distri-bution medium readable by a computer and encoding a computer program of instructions for executing a computer process.

The distribution medium may include a computer readable medium, a program storage medium, a record medium, a computer readable memory, a computer readable software distribution package, a computer readable signal, a computer readable telecommunications signal, and/or a computer readable compressed software package.

An embodiment of the computer process is shown and described in conjunction with FIG. 3. The computer program may be executed in a digital signal processor of a receiver.

Even though the invention has been described above with reference to an example according to the accompanying drawings, it is clear that the invention is not restricted thereto but it can be modified in several ways within the scope of the appended claims.

The invention claimed is:

1. A method comprising:
forming, by a receiver, an initial estimate of received data elements on a basis of an equalized signal comprising the data elements;
calculating a scaling factor by taking an inverse value of a conjugate transpose of a linear minimum mean-square error equalizer coefficient vector multiplied by a channel impulse response vector wherein the multiplied channel impulse response vector and the conjugate transpose of the linear minimum mean-square error equalizer coefficient vector are subtracted from a value of one before taking the inverse value; and
using the scaling factor for determining reliability of the initial estimate of the received data elements.

2. The method of claim 1, wherein the forming the initial estimate comprises forming the initial estimate of the received data elements defined as:

$$\tilde{b}(k) = \sqrt{P_{hs\text{-}dsch}}(w^H h)b(k) + n(k)$$

where $\tilde{b}(k)$ is the initial estimate of the received data elements, $P_{hs\text{-}dsch}$ is a power of a radio channel, w is the linear minimum mean-square error equalizer coefficient vector, h is the channel impulse response vector, $(\ )^H$ denotes a conjugate transpose, and $n(k)$ is noise-plus-interference.

3. The method of claim 1, wherein the using the scaling factor for determining the reliability of the initial estimate of the received data elements further comprises scaling the initial estimate of the received data elements by multiplying the initial estimate by a calculated scaling factor for obtaining a final estimate of the received data elements.

4. The method of claim 3, wherein the obtaining the final estimate comprises obtaining the final estimate of the received data elements defined as:

$$\hat{c}(k) = \frac{1}{1-w^H h}\hat{b}(k) = \frac{1}{1-A}\hat{b}(k)$$

where ĉ(k) is the final estimate of received data elements, b̂(k) is the initial estimate of the received data elements, w is the linear minimum mean-square error equalizer coefficient vector, h is the channel impulse response vector, ( )$^H$ denotes a conjugate transpose, A=w$^H$h, and $$\frac{1}{1-w^H h} = \frac{1}{1-A}$$

is the scaling factor.

5. The method of claim 1, wherein the using the scaling factor for determining the reliability of the initial estimate of the received data elements further comprises: obtaining a signal-to-interference ratio on a basis of the scaling factor, the linear minimum mean-square error equalizer coefficient vector, the channel impulse response vector, and a spreading factor.

6. The method of claim 5, wherein the signal-to-interference ratio is defined as:

$$SIR = \frac{A}{1-A} \cdot SF \cdot P_{hs-dsch}$$

where SIR is the signal-to-interference ratio, A=w$^H$h, w is the linear minimum mean-square error equalizer coefficient vector, h is the channel impulse response vector, ( )$^H$ denotes a conjugate transpose, SF is the spreading factor and P$_{hs-dsch}$ is a power of a radio channel.

7. An apparatus comprising:
a channel estimators, configured to estimate a channel impulse response of a radio channel;
an equalizer, operably coupled to the channel estimator, configured to generate linear minimum mean-square error equalizer coefficients and to provide an equalized signal from a received signal, comprising data elements, that has travelled through the estimated radio channel;
an estimating unit configured to form an initial estimate of the received data elements on a basis of the equalized signal; and
a processing unit configured to calculate a scaling factor by taking an inverse value of a conjugate transpose of a linear minimum mean-square error equalizer coefficient vector multiplied by a channel impulse response vector, wherein the multiplied channel impulse response vector and the conjugate transpose of the linear minimum mean-squire error equalizer coefficient vector are subtracted from a value of one before taking the inverse value, and to use the scaling factor to determine reliability of the initial estimate of the received data elements.

8. The apparatus of claim 7, wherein the initial estimate of the received data elements is defined by a correlator as:

$$\hat{b}(k) = \sqrt{P_{hs-dsch}}(w^H h)b(k)+n(k)$$

where b̂(k) is the initial estimate of the received data elements, P$_{hs-dsch}$ is a power of the radio channel, w is the linear minimum mean-square error equalizer coefficient vector, h is the channel impulse response vector, ( )$^H$ denotes a conjugate transpose, and n(k) is noise-plus-interference.

9. The apparatus of claim 7, wherein the processing unit is configured to use the scaling factor to determine a reliability of the initial estimate of the received data elements by forming a final estimate of the received data elements by multiplying the initial estimate of the received data elements by the calculated scaling factor.

10. The apparatus of claim 9, wherein the final estimate of the received data elements is defined by the processing unit as:

$$\hat{c}(k) = \frac{1}{1-w^H h}\hat{b}(k) = \frac{1}{1-A}\hat{b}(k)$$

where ĉ(k) is the final estimate of received data elements, b̂(k) is the initial estimate of the received data elements, w is the linear minimum mean-square error equalizer coefficient vector, h is the channel impulse response vector, ( )$^H$ denotes a conjugate transpose, A=w$^H$h, and $$\frac{1}{1-w^H h} = \frac{1}{1-A}$$

is the scaling factor.

11. The apparatus of claim 7, wherein the processing unit is configured to use the scaling factor to determine a reliability of the initial estimate of the received data elements by obtaining a signal-to-interference ratio on a basis of the scaling factor, the linear minimum mean-square error equalizer coefficient vector, the channel impulse response vector, and a spreading factor.

12. The apparatus of claim 11, wherein the signal-to-interference ratio is defined by the processing unit as:

$$SIR = \frac{A}{1-A} \cdot SF \cdot P_{hs-dsch}$$

where SIR is the signal-to-interference ratio, A=w$^H$h, w is the linear minimum mean-square error equalizer coefficient vector, h is the channel impulse response vector, ( )$^H$ denotes a conjugate transpose, SF is the spreading factor and P$_{hs-dsch}$ is the power of the radio channel.

13. An apparatus comprising:
receiving means for receiving data elements from a radio channel;
estimating means for estimating a channel impulse response of the radio channel;
equalizing means for generating linear minimum mean-square error equalizer coefficients and providing an equalized signal comprising the data elements;
estimating means for forming an initial estimate of the received data elements on a basis of the equalized signal; and
processing means for calculating a scaling factor by taking an inverse value of a conjugate transpose of a linear minimum mean-square error equalizer coefficient vector multiplied by a channel impulse response vector, wherein the multiplied channel impulse response vector and the conjugate transpose of the linear minimum mean-square equalizer coefficient vector are subtracted from a value of one before taking the inverse value, and for using the scaling factor for determining reliability of the initial estimate of the received data elements.

14. The apparatus of claim 13, wherein the processing means use the scaling factor for determining a reliability of the initial estimate of the received data elements by forming a final estimate of the received data elements by multiplying the initial estimate of the received data elements by the calculated scaling factor.

15. The apparatus of claim 13, wherein the processing means use the scaling factor for determining the reliability of the initial estimate of the received data elements by obtaining a signal-to-interference ratio on a basis of the scaling factor, the linear minimum mean-square error equalizer coefficient vector, the channel impulse response vector, and a spreading factor.

16. A system comprising:
at least one receiver comprising
at least one antenna configured to receive data elements from a radio channel;
a channel estimator, operably coupled to the at least one antenna, configured to estimate a channel impulse response of the radio channel;
an equalizer, operably coupled to the at least one antenna and to the channel estimator, configured to generate linear minimum mean-square error equalizer coefficients and providing an equalized signal;
an estimating unit configured to form an initial estimate of the received data elements on a basis of the equalized signal comprising the received data elements; and
a processing unit configured to calculate a scaling factor by taking an inverse value of a conjugate transpose of a linear minimum mean-square error equalizer coefficient vector multiplied by a channel impulse response vector, wherein the multiplied channel impulse response vector and the conjugate transpose of the linear minimum mean-square error equalizer coefficient vector are subtracted from a value of one before taking the inverse value, and to use the scaling factor to determine reliability of the initial estimate of the received data elements.

17. The system of claim 16, wherein the processing unit is configured to use the scaling factor to determine reliability of the initial estimate of the received data elements by forming a final estimate of the received data elements by multiplying the initial estimate of received data elements by the calculated scaling factor.

18. The system of claim 16, wherein the processing unit is configured to use the scaling factor to determine reliability of the initial estimate of the received data elements by obtaining a signal-to-interference ratio on a basis of the scaling factor, the linear minimum mean-square error equalizer coefficient vector, the channel impulse response vector and a spreading factor.

19. A system, comprising:
at least one receiver comprising
receiving means for receiving data elements from a radio channel;
estimating means for estimating a channel impulse response of the radio channel;
equalizing means for generating linear minimum mean-square error equalizer coefficients and providing equalized signal comprising the received data elements;
estimating means for forming an initial estimate of the received data elements on the basis of equalized signal; and
processing means for calculating a scaling factor by taking an inverse value of a conjugate transpose of a linear minimum mean-square error equalizer coefficient vector multiplied by a channel impulse response vector, wherein the multiplied channel impulse response vector and the conjugate transpose of the linear minimum mean-squire error equalizer coefficient vector are subtracted from a value of one before taking the inverse value, and for using the scaling factor for determining reliability of the initial estimate of the received data elements.

20. The system of claim 19, wherein the processing means use the scaling factor for determining a reliability of the initial estimate of the received data elements by forming a final estimate of the received data elements by multiplying the initial estimate of the received data elements by the calculated scaling factor.

21. The system of claim 19, wherein the processing means use the scaling factor for determining a reliability of the initial estimate of the received data elements by obtaining a signal-to-interference ratio on a basis of the scaling factor, the linear minimum mean-square error equalizer coefficient vector, the channel impulse response vector, and a spreading factor.

22. A radio terminal, comprising:
at least one receiver comprising
at least one antenna configured to receive data elements from a radio channel;
a channel estimator, operably coupled to the at least one antenna, configured to estimate a channel impulse response of the radio channel;
an equalizer, operably coupled to the at least one antenna and to the channel estimator, configured to generate linear minimum mean-square error equalizer coefficients and to provide an equalized signal comprising the received data elements;
an estimating unit configured to form an initial estimate of received data elements on a basis of an equalized signal; and
a processing unit configured to calculate a scaling factor by taking an inverse value of a conjugate transpose of a linear minimum mean-square error equalizer coefficient vector multiplied by a channel impulse response vector, wherein the multiplied channel impulse response vector and the conjugate transpose of the linear minimum mean-square error equalizer coefficient vector are subtracted from a value of one before taking the inverse value, and to use the scaling factor to determine reliability of the initial estimate of the received data elements.

23. The radio terminal of claim 22, wherein the processing unit is configured to use the scaling factor to determine reliability of the initial estimate of the received data elements by forming a final estimate of the received data elements by multiplying the initial estimate of received data elements by the calculated scaling factor.

24. The radio terminal of claim 22, wherein the processing unit is configured to use the scaling factor for determining a reliability of the initial estimate of the received data elements by obtaining a signal-to-interference ratio on a basis of the scaling factor, the linear minimum mean-square error equalizer coefficient vector, the channel impulse response vector, and a spreading factor.

25. A base station for a radio system, comprising:
at least one receiver comprising
- at least one antenna configured to receive data elements from a radio channel;
- a channel estimator, operably coupled to the at least one antenna, configured to estimate a channel impulse response of the radio channel;
- an equalizer, operably coupled to the at least one antenna and to the channel estimator, configured to generate linear minimum mean-square error equalizer coefficients and to provide an equalized signal comprising the received data elements;
- an estimating unit configured to form an initial estimate of received data elements on a basis of the equalized signal; and
- a processing unit configured to calculate a scaling factor by taking an inverse value of a conjugate transpose of a linear minimum mean-square error equalizer coefficient vector multiplied by a channel impulse response vector, wherein the multiplied channel impulse response vector and the conjugate transpose of the linear minimum mean-square error equalizer coefficient vector are subtracted from a value of one before taking the inverse value, and to use the scaling factor to determine reliability of the initial estimate of the received data elements.

26. The base station of claim 25, wherein the processing unit is configured to use the scaling factor to determine reliability of the initial estimate of the received data elements by forming a final estimate of the received data elements by multiplying the initial estimate of received data elements by the calculated scaling factor.

27. The base station of claim 25, wherein the processing unit is configured to use the scaling factor to determine a reliability of the initial estimate of the received data elements by obtaining a signal-to-interference ratio on a basis of the scaling factor, the linear minimum mean-square error equalizer coefficient vector, the channel impulse response vector, and a spreading factor.

28. A computer program product, embodied on a computer-readable medium, encoding a computer process of instructions for executing a computer process for processing received data, the process comprising:
- forming, by a receiver, an initial estimate of received data elements on a basis of an equalized signal comprising the data elements;
- calculating a scaling factor by taking an inverse value of a conjugate transpose of a linear minimum mean-square error equalizer coefficient vector multiplied by a channel impulse response vector, wherein the multiplied channel impulse response vector and the conjugate transpose of the linear minimum mean-square error equalizer coefficient vector are subtracted from a value of one before taking the inverse value; and
- using the scaling factor for determining reliability of the initial estimate of the received data elements.

29. The computer program product of claim 28, the process further comprising using the scaling factor for determining a reliability of the initial estimate of the received data elements by scaling the initial estimate of the received data elements by multiplying the initial estimate by the calculated scaling factor for obtaining a final estimate of the received data elements.

30. The computer program product of claim 28, the process further comprising using the scaling factor for determining the reliability of the initial estimate of the received data elements by obtaining a signal-to-interference ratio on a basis of the scaling factor, the linear minimum mean-square error equalizer coefficient vector, the channel impulse response vector, and a spreading factor.

31. A computer program distribution medium readable by a computer and encoding a computer program of instructions for executing a computer process for processing received data, the process comprising:
- forming, by a receiver, an initial estimate of received data elements on a basis of an equalized signal comprising the data elements;
- calculating a scaling factor by taking an inverse value of a conjugate transpose of a linear minimum mean-square error equalizer coefficient vector multiplied by a channel impulse response vector, wherein the multiplied channel impulse response vector and the conjugate transpose of the linear minimum mean-square error equalizer coefficient vector are subtracted from a value of one before taking the inverse value; and
- using the scaling factor for determining reliability of the initial estimate of the received data elements.

32. The computer program distribution medium of claim 31, the distribution medium comprising one of a computer readable medium, a program storage medium, a record medium, a computer readable memory, a computer readable software distribution package, a computer readable signal, a computer readable telecommunications signal, and a computer readable compressed software package.

* * * * *